United States Patent [19]

Feutrel

[11] 4,396,573

[45] Aug. 2, 1983

[54] SPACE GRATE FOR FUEL-ELEMENTS OF NUCLEAR REACTORS

[75] Inventor: Claude Feutrel, Vauhallan, France

[73] Assignee: Commissariat a l'Energie Atomique, Paris, France

[21] Appl. No.: 181,848

[22] Filed: Aug. 27, 1980

[30] Foreign Application Priority Data

Sep. 7, 1979 [FR] France .................. 79 22437

[51] Int. Cl.³ .............................................. G21C 3/34
[52] U.S. Cl. ...................................... 376/442; 376/438
[58] Field of Search .................. 376/438, 442; 428/598

[56] References Cited

U.S. PATENT DOCUMENTS 3,510,397  5/1970  Zettervall ........................... 376/442
3,844,887 10/1974  Georges ............................. 376/442
4,224,107  9/1980  Delafosse .......................... 376/442

Primary Examiner—Donald P. Walsh
Attorney, Agent, or Firm—Michael N. Meller; Anthony H. Handal

[57] ABSTRACT

A spacer grid assembly provides elastic support and secure positioning of fuel elements in a nuclear reactor. This spacer grid assembly comprises two families of thin perforated sheets, the sheets of one family being parallel to each other and perpendicular to the sheets of the other family. The interlaced assembly of these interfitting sheets forms a three-dimensional lattice of square-sectioned cells for positioning and securing the fuel elements vertically. This spacer grid assembly comprises large recesses within the cell walls that define the spring means. The spring means comprises two plates shaped as a flexible vault, a sheet stud connecting these plates, and two triangular strips integral with this sheet stud on one side and opposite each other on this same side, and ending in circular and protruding pads. These pads contact the fuel element and transmit the bearing power of the spring means to the fuel element. The fuel element is also in contact with rigid bosses on the face of the cell opposite the spring means. After the fuel element is fitted in the cell, the spring means move within the cell wall.

1 Claim, 3 Drawing Figures

SPACE GRATE FOR FUEL-ELEMENTS OF NUCLEAR REACTORS

The present invention discloses a space grid assembly for fuel elements of nuclear reactors. Such grids are intended to space a bundle of nuclear fuel elements within a combination of nuclear reactors, these elements being kept parallel to one another according to a specific lattice structure. In addition; such grids provide elastic support to the fuel elements by the flexion of different successive areas distributed according to their length, thereby preventing the vibration that would otherwise result from the flow of liquid coolant in contact with the fuel elements.

From the prior art many space grid assemblies are known like the one hereinbefore described, including in particular the assembling of two families of thin perforated sheets the sheets of one family being parallel to each other and perpendicular to the sheets of the other family. These sheets have regular spaced notches that are to be joined one with another thereby, delimiting square-sectioned cells, each one being traversed by a fuel element of the bundle. In order to provide the required elastic support on these fuel elements (rods), the sheets are appropriately cut and pressed so that within every cell there are eight bearing points, comprising four rigid projecting bosses and four flexible strips acting as spring means. These bearing points are arranged in vertical pairs and contact the rod section at 90° sections. Thus, every fuel element within a cell is secured between two sets of rigid bosses and flexible strips provided by two sets of opposing parallel sheets.

An example of such a spacer grid assembly for fuel elements of nuclear reactors is disclosed and by the French Pat. No. 76 00877 filed on Jan. 14, 1976 in the name of the "Commissariat à l'Energie atomique" for "Improvement of spacer grid assemblies for fuel elements of nuclear reactors".

In another embodiment of the invention described in this patent, the grid is provided with corrugated strips which are joined with the ends of the flat sheets within areas lightened by slots. These strips are provided with recesses which form supporting clips having some elasticity with respect to the strips. These latter thus achieve a grouping of two spring assemblies, the effects of which on rods traversing the grid are compounded. The resulting amount of flexing for the same support pressure is substantially increased compared to the flexing of a conventional spring. It may vary while the support pressure is kept within the range of application.

However, the disadvantage of the spring according to the French Pat. No. 76 00877 is its three support points on the fuel element. The U-shaped middle support point plays a prominent part in the total hydraulic head loss of the grid. Moreover, if this middle support point is pulled in the course of the system flexion, a bending stress curve with two incidences results.

U.S. Pat. No. 3,746,619 discloses a space grid assembly for fuel elements of nuclear reactors consisting of two families of sheets arranged perpendicular to each other so as to form cells within which the fuel elements are situated. Spring fingers that end with a round element are provided under and below the grid. This grid comprises bosses on the side of the cell opposite to the side with the spring. Within every cell there are two spring elements and on the opposite faces, two rigid bosses.

French Pat. No. 1.534.275 discloses a circular space grid assembly for fuel elements, made of ring elements welded to each other and disposed in an outer ring. Within every ring element there are two rigid bosses and a spring element which presses the fuel elements against the rigid bosses. Some parts of the spring elements become narrower above and below the ring element.

Springs such as the ones described in the above-cited patents have no combined flexing so that the resulting amount of flexing for the same support pressure is appreciably lower than that of the present invention.

Also, the ends of the bearing spring on the fuel element are outside the grid. Therefore, they are far from the rigid bosses provided in the grid, which results in a new bending stress for the fuel element.

Lastly, every fuel element has only six support points in a certain cell.

The object of the present invention is to provide a spacer grid assembly for fuel elements of nuclear reactors which overcomes these disadvantages.

The present invention retains the principle of a composite bending which enables extensive camber within a narrow space. Thereby, the input of fuel elements, the length of which may be important within the grid, is made easier.

Every fuel element has eight bearing points in every cell, viz four bearing points on the rigid bosses and four bearing points on the ends of the spring means. Thus, the fuel element is held perfectly secure in the cell. In other respects, it is observed that the points of contact of the spring means and the rigid bosses with the fuel element are not far apart, so that the fuel element is not subjected to an extra bending stress. Moreover, it is known that a number of bushes are welded on the spacer grid assembly, and distributed within the bundle of fuel elements for the crossing of the guide tubes. In the same way as for the fuel elements, according to this invention the spring means subjected to combined bending stress make easier positioning of the crossing bushes of the guide tubes by its positioning places, which are even surfaces on which the ridges of the slots provided in the bush can be bound by brazing.

Another important advantage of this grid is the reduction of the apparent section of the spring means, which facilitates the flow of coolant. By reference to the accompanying drawings, it will be understood that after the fuel element is positioned, the spring section moves within the thickness of the cell wall. Lastly, in the grid according to the invention the stress on the fuel element is linearly dependent on the amount of flexion of the spring means.

These objectives are achieved by the present invention. The large recesses in the surface of at least a cell wall define spring means. These spring means comprise two plates formed as a flexible vault, a sheet stud that joins the middle of these plates, and two triangular strips integral with this sheet stud on one side and opposite each other on this same side. A circular pad which is to transmit the stress of the spring means to the fuel element is provided at the top of these triangular strips and projects from them, so that after the fuel element is positioned, the whole section of the spring means moves within the wall of the cell except for both circular pads.

It is preferred the grid be made of Inconel. A better description of the invention follows. The example discussed is given only as a guide and is in no way intended to limit the scope of the invention. The description is referred to the accompanying drawings.

Figure 1:
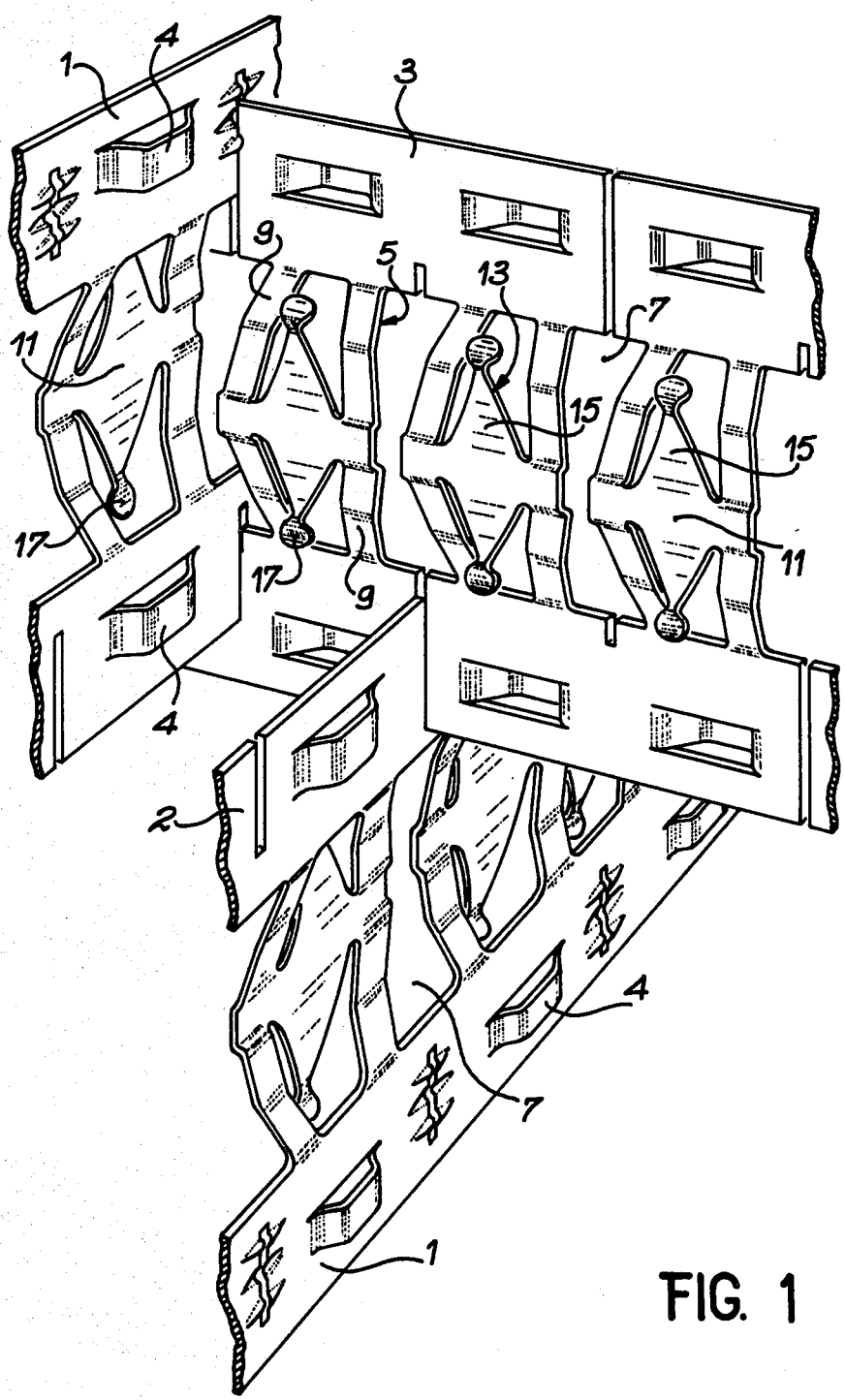
FIG. 1 is the drawing of three sheets of a grid partly fitted together according to the invention.

FIG. 1 shows three sheets, referred to as 1, 2 and 3, of a space grid assembly for fuel elements of a nuclear reactor in accordance with this invention. This spacer grid construction has an outer frame (not shown) made of plates tack-welded to each other. Within the frame formed by the lateral plates there are fitted two families of sheets, the sheets of one family being parallel to each other (e.g., the sheets 1 and 2, and perpendicular to the sheets of the other family. These sheets delimit a set of cells in which are fitted the fuel elements (not shown). Within every cell there are rigid bosses (4) against which the fuel elements are pressed by the bearing power of the spring means (5). Large recesses (7) are provided in the sheets of the grid. The two thin plates (9) are shaped as a flexible vault. A sheet stud (11) joins the middle of these plates (9). Two triangular strips (15) are integral with the sheet stud (11) on one side. At the top of every triangular strip (15) there is a circular and protruding pad (17), through which the bearing power of the spring means (5) 5 is transmitted to the fuel element.

Figure 2:
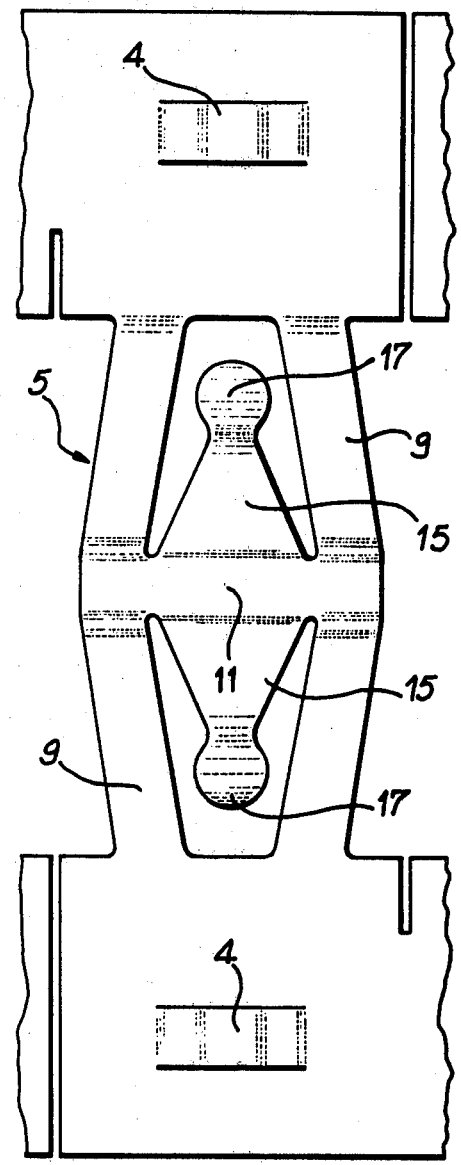
FIG. 2 is a front view of the spring means according to the invention.

FIG. 2 is a front view of the spring means (5) made according to the present the invention, showing the two plates (9) shaped as a flexible vault, the sheet stud (11) joining the middle of every plate (9), and the two triangular strips (15) integral of the sheet stud (11) by one of their side, each ended by a circular pad (17). Also shown are the two rigid bearings (4) against which the fuel element is pressed by the spring means provided in the opposite parallel face of the cell.

Figure 3:
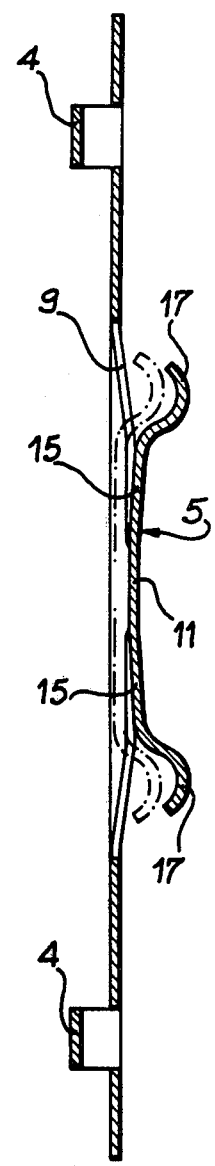
FIG. 3 is a side view of the spring means shown in FIG. 2.

FIG. 3 is a side view of the spring means (5) showing the shape of the triangular strips (15) and the circular pads (17).

It can be seen that the bending of the spring means (5) when the fuel element is fitted comprises the bending of the plates (9) and the bending of the triangular strips (15). It follows from this that the spring means provides an important camber within a reduced space. The camber of the spring means can be varied and the bearing pressure can be kept within the range of planned use.

The large base width of the triangular strip (15) provides the spring means (5) with the necessary stiffness to ensure a secure positioning of the fuel elements without requiring a metal with strong neutron absorption. Indeed, such spring means (5) may be cut in grids made of metal with a low neutron absorption, such as Zircalloy. Of course, other materials can be considered for the manufacture of these grids.

Note that the spring means (5) has only two bearing points on the fuel element, these being the circular pads (17). The projecting shape of these pads allows the whole section of the spring means (5) except for the circular pad (17) to move within the cell wall after the fuel element has been fitted. Such a position of the spring means is shown by dotted lines in FIG. 3. This arrangement enables a decrease of the resistance offered to the flow of the coolant and, in consequence, an increase in the hydraulic performance of the grid.

I claim:

1. Spacer grid assembly for fuel elements in a nuclear reactor having an interlaced assembly of two families of thin interfitting sheets to form a three-dimensional lattice means for securing said fuel elements vertically, wherein the sheets of each family are parallel to each other and perpendicular to the sheets of the other family thus defining square cross section cells, with large recesses (7) in the surface of at least a wall of the cell, four bosses within each cell, two spring means (5) in each cell, each spring means comprising two plates (9) shaped as a flexible unit with a sheet stud (11) joining the middle of the said plates (9), a triangular strip (15) cut in each of said plates and integral of the said sheet stud by one of its sides, with a protruding pad (17) having a curvilinear profile provided at the end of each triangular strip (15) to transmit the bearing and holding power of the spring (5) to keep the fuel elements stationary, whereby the four bosses and four pads constitute the only bearing points within each cell.

* * * * *